United States Patent

Chiang

[11] Patent Number: 5,980,116
[45] Date of Patent: Nov. 9, 1999

[54] CRANK AXLE FOR BICYCLE

[76] Inventor: Douglas Chiang, No.487, Ko-Chung Rd., Ta-Li City, Taichung Hsien, Taiwan

[21] Appl. No.: 09/000,818
[22] Filed: Dec. 30, 1997
[51] Int. Cl.$^6$ .............................. F16C 9/02; B62K 19/34
[52] U.S. Cl. ............................................. 384/545; 384/538
[58] Field of Search ..................................... 384/545, 457, 384/458, 538, 540; 74/594.2

[56] References Cited

U.S. PATENT DOCUMENTS

| | | | |
|---|---|---|---|
| 637,205 | 11/1899 | Heath | 384/545 |
| 1,811,679 | 6/1931 | Volet | 384/538 |
| 3,937,535 | 2/1976 | Ladin | 384/540 |
| 4,441,383 | 4/1984 | Segawa | 74/594.2 |
| 5,285,701 | 2/1994 | Parachinni | 74/594.2 |
| 5,549,396 | 8/1996 | Chiang | 384/545 |
| 5,572,909 | 11/1996 | Chi | 384/458 X |

Primary Examiner—Thomas R. Hannon
Attorney, Agent, or Firm—Bacon & Thomas, PLLC

[57] ABSTRACT

An improved crank axle for bicycle in which the tapered sleeve and the tapered bearing is provided with a retaining ring such that the tapered sleeve and the tapered bearing are integrally interconnected. The overall rigidity is enhanced and the service life is prolonged. A water-proof effect can be also attained and the crank axle can be quickly manufactured and assembled.

1 Claim, 3 Drawing Sheets

CRANK AXLE FOR BICYCLE

FIELD OF THE INVENTION

The present invention relates to an improved crank axle, more particularly, to an improved crank axle for bicycle. One end of the crank axle is provided with a tapered end while the other end is provided with a locking thread. A tapered sleeve and a tapered bearing are further incorporated to facilitate the quick assembling of the crank axle assembly.

DESCRIPTION OF PRIOR ART

U.S. Pat. No. 5,549,396, issued on Aug. 27, 1996, to the same applicant has disclosed a bicycle crank axle in which a tapered sleeve and tapered bearing are incorporated to facilitate an easy and quick assembling of the crank axle. However, the application of tapered bevel surface may result an unbalanced distribution on the tapered bearing. As a result, the overall operation of the crank axle will be negatively influenced.

SUMMARY OF THE INVENTION

It is the objective of this invention to provide an improved crank axle in which the end portion of the tapered sleeve and the tapered bearing is provided with a fastening device such that the tapered sleeve can be integrally assembled with the tapered bearing to facilitate an easy and quick assembling of the crank axle. On the other hand, a water-proof effect can be also attained to prolong the service life of the crank axle.

BRIEF DESCRIPTION OF THE DRAWINGS

In order that the present invention may more readily be understood the following description is given, merely by way of example with reference to the accompanying drawings, in which.

DETAILED DESCRIPTION OF PREFERRED EMBODIMENT

Figure 1:
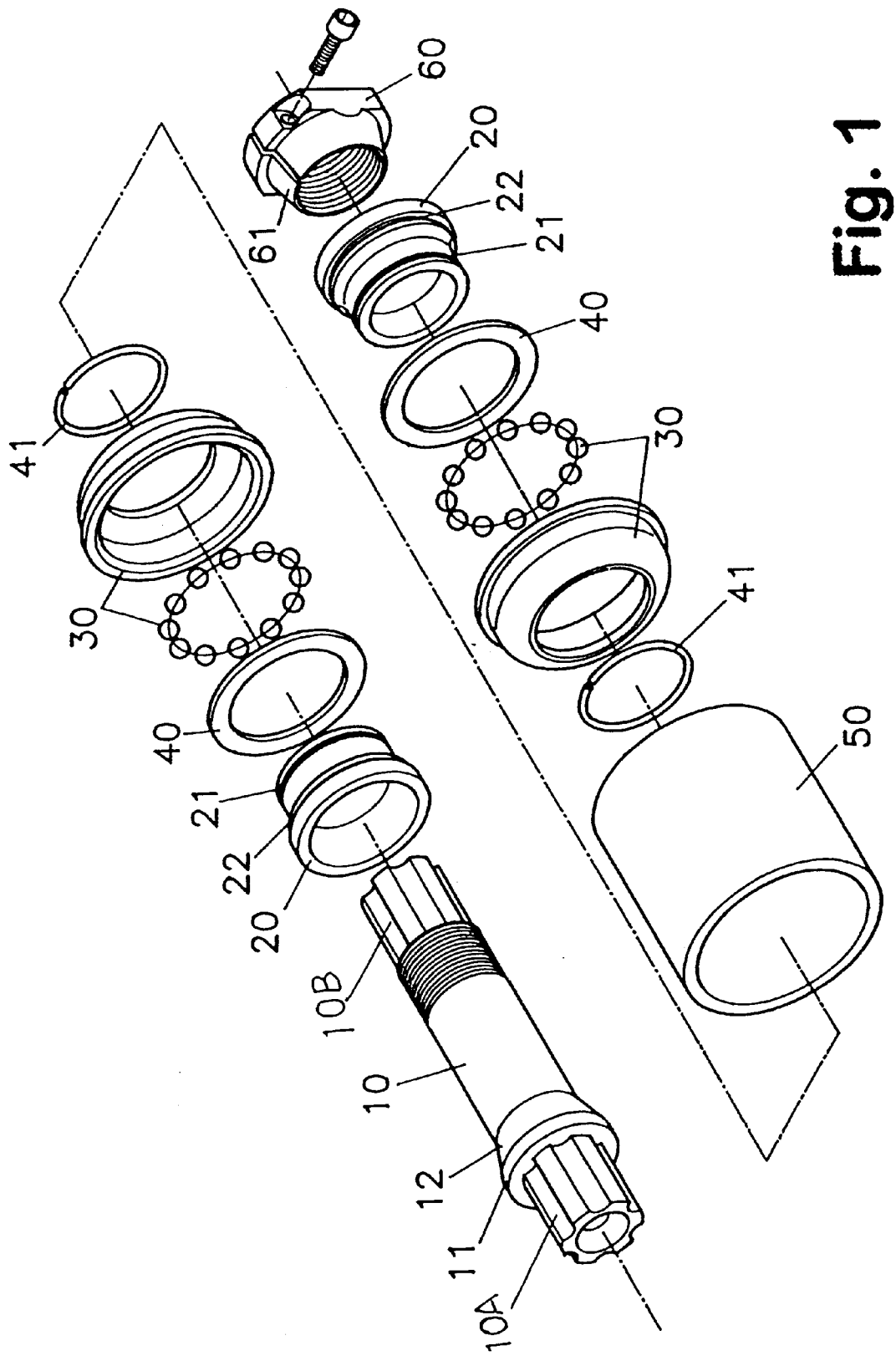
FIG. 1 is an exploded perspective view of the improved crank axle for bicycle made according to the present invention.
Figure 2:
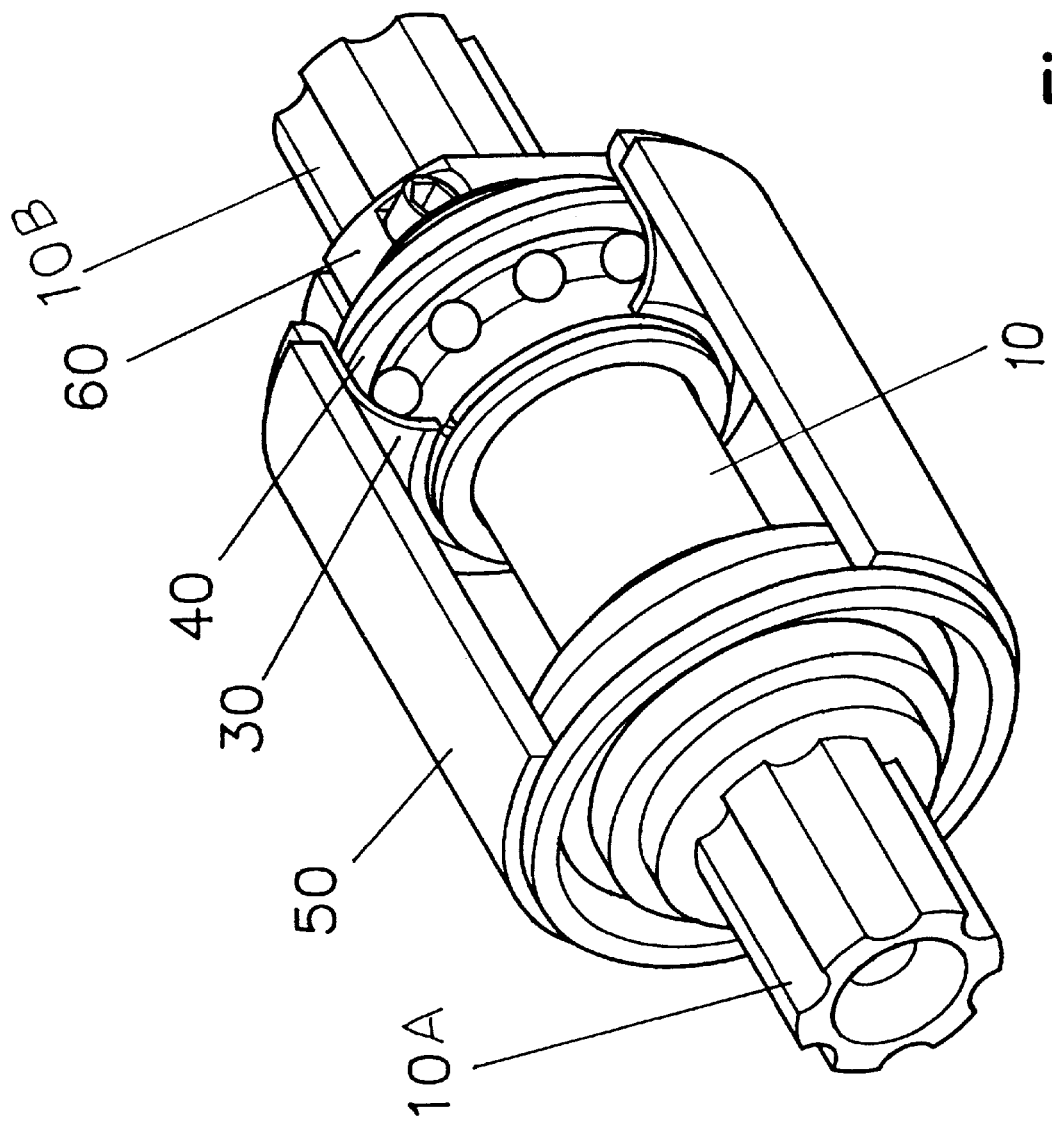
FIG. 2 is a perspective view of the improved crank axle made according to the present invention.

Referring to FIGS. 1 and 2, the crank axle 10 is provided with a spine section 10A, 10B at both ends. In this embodiment, there are six (6) elongate teeth having a round bottom thereof. The crank axle 10 is further provided with a stopping block 11 which is provided with a tapered bevel surface 12 therein. A tapered sleeve 20 is seated on the tapered bevel surface 12. The tapered sleeve 20 is further provided with a front and rear retaining grooves 21 and 22 in the position in which the tapered bearing 30 is seated. A retaining ring 41 and a seal 40 are respectively mounted within the front and rear retaining grooves 21 and 22. When the crank axle 10 and the tapered bearing 30 are mounted into the frame tube 50, the other end of the frame tube 50 can be disposed with an identical tapered sleeve 20 and a tapered bearing 30. Afterward, a locking nut 60 having a tapered bevel surface 61 can be locked into the frame tube 50. By this arrangement, the crank axle can be readily and smoothly mounted. Besides, a water-proof effect can also be readily attained to prolong the service life.

Figure 3A:
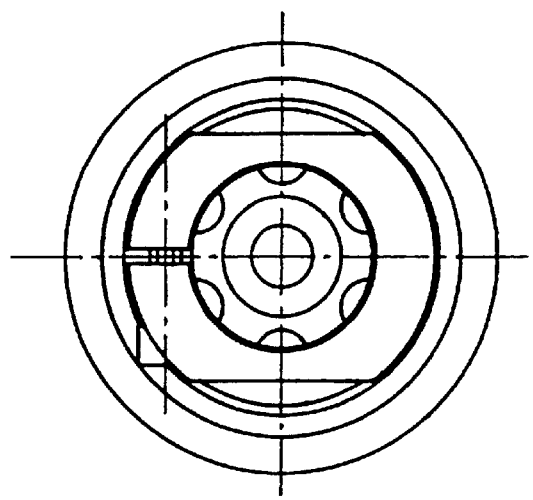
FIG. 3A is a right elevational view of the invnetion.
Figure 3:
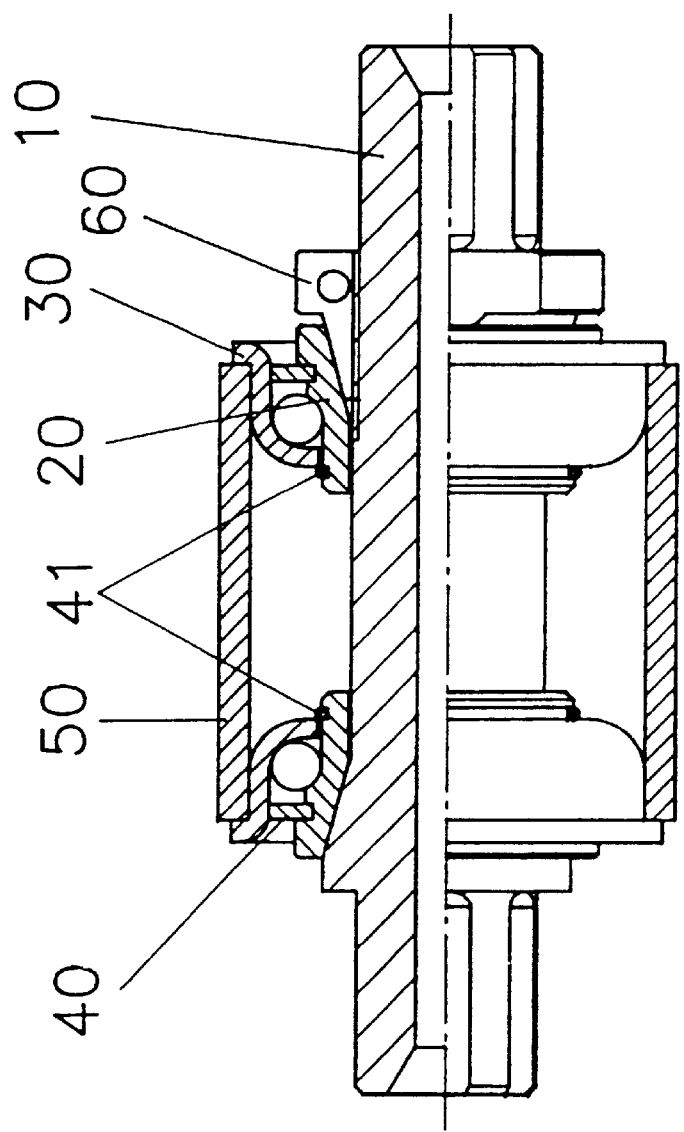
FIG. 3 is a cross sectional view of the crank axle made according to the present invention.

Referring to FIG. 3, a cross sectional view of the crank axle made according to the present invention, and FIG. 3A is a right elevational view of the present invention. The tapered sleeve 20 is firstly enveloped with the tapered bearing 30 and then the retaining ring 41 and the seal 40 are disposed within the front and rear retaining grooves 21 and 22 respectively. Then the tapered bevel surface 12 of the stopping block 11 of the crank axle 10 is engaged with the tapered sleeve 20. Then the other end of the tapered sleeve 20 is mounted from the other end of the frame tube 50. As a result, the assembling work is completed.

The improved crank axle features an easy and quick assembling. Besides, since the tapered sleeve 20 is interconnected with the tapered bearing 30 by means of the retaining ring 30, the overall rigidity is enhanced. On the other hand, the tapered bearing 30 and the tapered sleeve 20 can be also prevented from separating and losing. As both ends of the crank axle 10 is provided with a spine sections 10A, 10B, the engagement between the whole crank axle and the frame can be further enhanced.

From the above description, the improved crank axle features a simplified but durable configuration. The crank axle 10 is provided with a tapered bevel surface 12 to engage with the tapered sleeve 20. On the other hand, a retaining ring 41 is provided at the tapered sleeve 20 to integrally fix the tapered bearing 30 thereof. As a result, the assembling can be quickly performed and the engagement is further enhanced. A water proof effect can be also attained to prolong the service life.

While particular embodiment of the present invention has been illustrated and described, it would be obvious to those skilled in the art that various other changes and modifications can be made without departing from the spirit and scope of the invention. It is therefore intended to cover in the appended claim all such changes and modifications that are within the scope of the present invention.

I claim:

1. An improved crank axle for bicycle, comprising a crank axle being provided with a spine section at both ends respectively, said crank axle being further provided with a stopping block which is provided with a tapered bevel surface thereof, a tapered sleeve being seated onto said tapered bevel surface, said tapered sleeve being provided with a front and rear retaining grooves in the position in which a tapered bearing is seated, a retaining ring and a seal being respectively mounted within said front and rear retaining grooves, wherein after said crank axle and said tapered bearing are mounted into the frame tube, the other end of said frame tube can be disposed with an identical tapered sleeve and tapered bearing set such that said crank axle can be readily and smoothly mounted, wherein a water-proof effect can also be readily attained to prolong the service life.

* * * * *